May 24, 1955

J. LAMB 2,709,062

PORTABLE POWERED VALVE OPERATOR
AND VALVE STRUCTURE THEREFOR

Filed June 29, 1954

INVENTOR: JOHN LAMB

BY: *Oswald H. Milmore*

HIS ATTORNEY

INVENTOR
JOHN LAMB
BY Oswald F. Milmore
HIS ATTORNEY

INVENTOR:
JOHN LAMB

United States Patent Office 2,709,062
Patented May 24, 1955

2,709,062

PORTABLE POWERED VALVE OPERATOR AND VALVE STRUCTURE THEREFOR

John Lamb, Great St. Helen's, London, England, assignor to Shell Development Company, New York, N. Y., a corporation of Delaware Application June 29, 1954, Serial No. 440,190

10 Claims. (Cl. 251—14)

This invention relates to the power operation of valves for the control of fluid flow of the kind in which rotation of a handwheel causes movement of the valve member between open and closed positions, and is applicable to valves wherein such rotation of the handwheel causes rotational and/or axial movement of the valve spindle. More particularly, the invention relates to a portable power unit or operator that can be applied to such a valve, to a valve structure adapted to coact with such an operator to be operated thereby, and to the combination of the valve and operator.

The invention is particularly, although not exclusively, applicable to the power operation of such valves on oil tankers and like vessels carrying liquid in bulk either as cargo or to meet the ship's requirements; it may, however, be employed in other fields, for example, in pipe lines, industrial plants, etc., especially where flow control valves are provided that are large in size and are operated with insufficient frequency to warrant the installation of an individual powered operator at each valve.

For example, it is common practice for an oil tanker of 18,000 tons dead weight to have over 60 such valves and with present day loading and unloading rates of the order of 4,000 tons per hour it will be appreciated that the manual operation of such valves not only involves arduous conditions for the crew but materially increases the possibility of a tank overflowing with the attendant fire and explosion hazard. The usual gate valve provided on tankers requires between 10 and 20 rotations of the operating spindle in order to move the valve member between its extreme positions. Frequently two such valves must be operated simultaneously in order to stop the flow of oil into one tank and to direct it into another and, since such operations must be performed quickly to avoid overflowing, the present tendency with manually operated valves is for the crew to change over tanks before this is really necessary, thus entailing a longer "topping-up" period and a consequent increased overall loading time.

Although the above difficulties could be overcome by providing a power operator for each valve it will be readily apparent that the cost of providing say 60 motors and their ancillary equipment would be excessively high.

An object of the present invention is to provide power operation for valves, such as gate or sluice valves as used on ships such as tankers, by means of a portable power unit which can readily be applied to a selected valve to open or close the valve in much less time than the operation can be effected manually under usual conditions.

According to the present invention apparatus for the power operation of a valve of the kind in which rotation of a handwheel causes rotational and/or axial movement of the valve spindle for moving the valve member between open and closed positions comprises, in combination a reversible motor, means for disengageably coupling the output shaft of the motor to a drive element of the valve, such as the valve spindle or a handwheel or other member having driving connection therewith, and control means operative in accordance with the position of the valve member for starting and stopping the motor. The term "handwheel" is intended to include means such as a wheel or capstan which is or may be used for the manual operation of the valve.

Preferably the control means for starting and stopping the motor comprises mechanism including a position-responsive element, such as a cam having a camming surface or a cam having a cam follower engaging the camming surface, moving with the valve member, which mechanism, when the output shaft of the motor is drivingly coupled to the drive element of the valve, operates control means on the driving motor for permitting operation of the motor when and only when the valve spindle is in a position in which it requires at least a predetermined further travel, e. g., a further half-turn, of the handwheel to bring the valve member into one or other of its extreme positions.

Conveniently, the output shaft of the motor carries a bevel pinion for engagement with a mating gear wheel on the valve spindle or on the handwheel or other member having driving connection therewith.

The motor is conveniently a rotary pneumatic motor provided with a normally closed, spring-loaded cut-out in the air supply conduit thereof by which power, in the form of compressed air, is supplied, said cut-out being adapted to be engaged by said mechanism for starting and stopping the motor, and the motor being preferably provided with manually operable means for reversing and stopping the motor with the valve member in a position intermediate its extreme positions.

The portable powered operator may be applied to valves of different types, the construction of the parts of the valve that cooperate with the portable operator being appropriate to the valve type, as indicated below. These constructions preferably provide a camming surface that moves vertically and is non-rotatable, although it will be appreciated that the invention is applicable also to valves wherein the cam surfaces rotate.

In the case of a valve of the rotating non-rising spindle, and rotating non-rising handwheel type, the motor may rotate said valve spindle through a bevel pinion on the output shaft of the motor and a mating gear wheel fixed to the valve spindle and said camming surface may be formed on a member movable by rotation of said valve spindle, for example an internally threaded, non-rotatable collar carried on a threaded portion of said valve spindle.

In an alternative construction for use when the valve is of the non-rotating rising spindle, and rotating non-rising handwheel type, said camming surface is formed on an internally threaded, non-rotatable collar carried on an externally threaded portion of a bushing which is rotatable with said handwheel by a bevel gear wheel adapted to be engaged by a mating pinion on the output shaft of the motor, said bushing having an internal thread adapted on rotation of said bushing to raise or lower a threaded valve spindle to open or close the valve.

In another alternative construction suitable when the valve is of the rising rotating spindle, and rising rotating handwheel type, said camming surface is formed on an internally threaded non-rotatable collar carried on an externally threaded portion of a bushing, said bushing being rotatable by a bevel gear wheel adapted to be engaged by a mating pinion on the output shaft of the motor and being drivingly coupled to the valve spindle in such a manner as to permit said spindle to move vertically within said bushing on rotation of said spindle to open or close the valve.

Preferably retaining means are provided for positively holding the motor in position in relation to the valve structure during operation.

Preferably the driving motor is a rotary pneumatic motor having a normally closed, spring-loaded cut-out in the air-supply conduit thereof, which cut-out is adapted for actuation by the mechanism incorporated in the valve.

A number of types of gate or sluice valve adapted in accordance with the invention for operation by means of a portable powered operator embodying a compressed air motor will now be described by way of example with reference to the accompanying drawings forming a part of this specification, in which.

Figure 3:
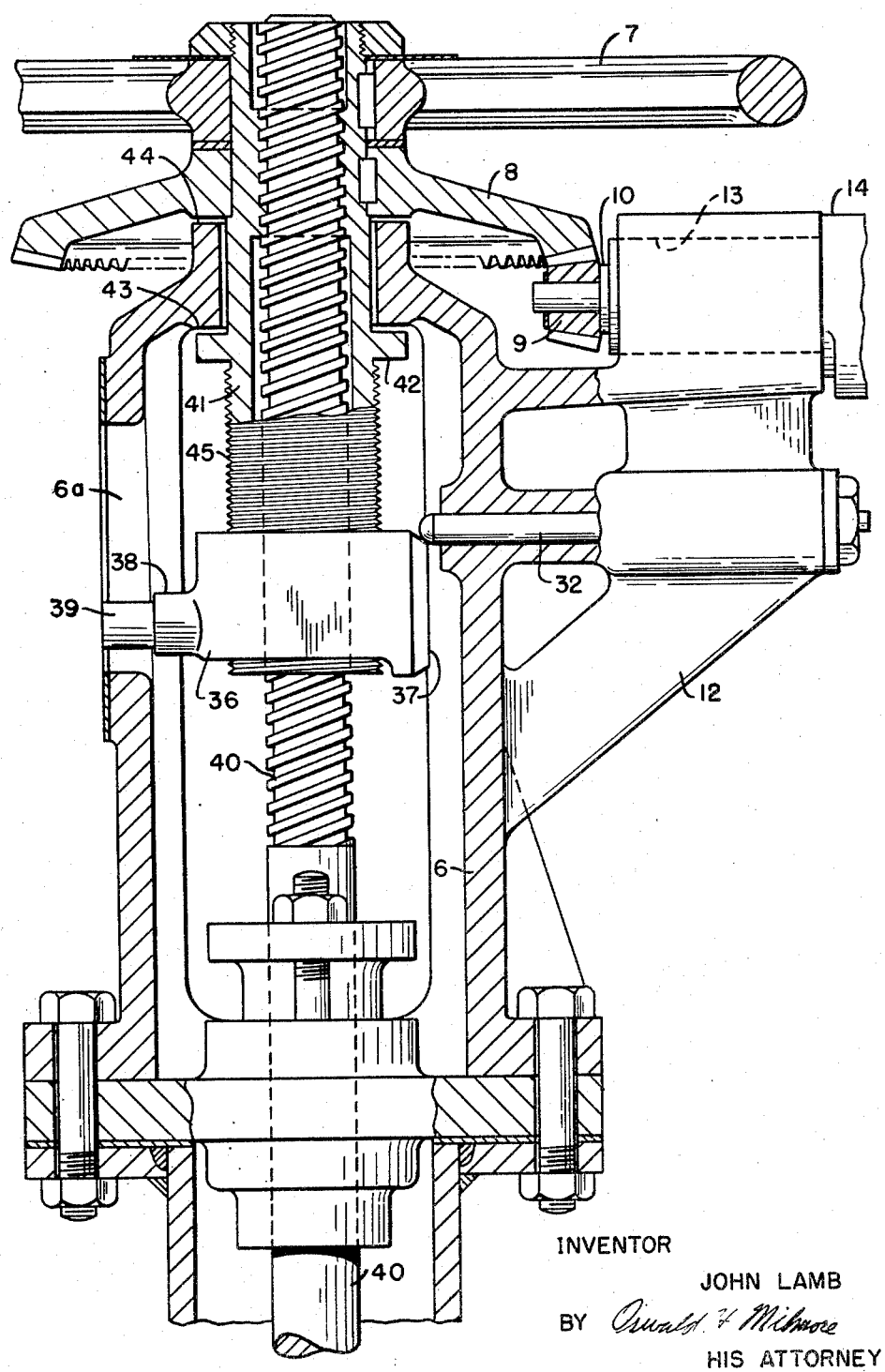
Figure 4:
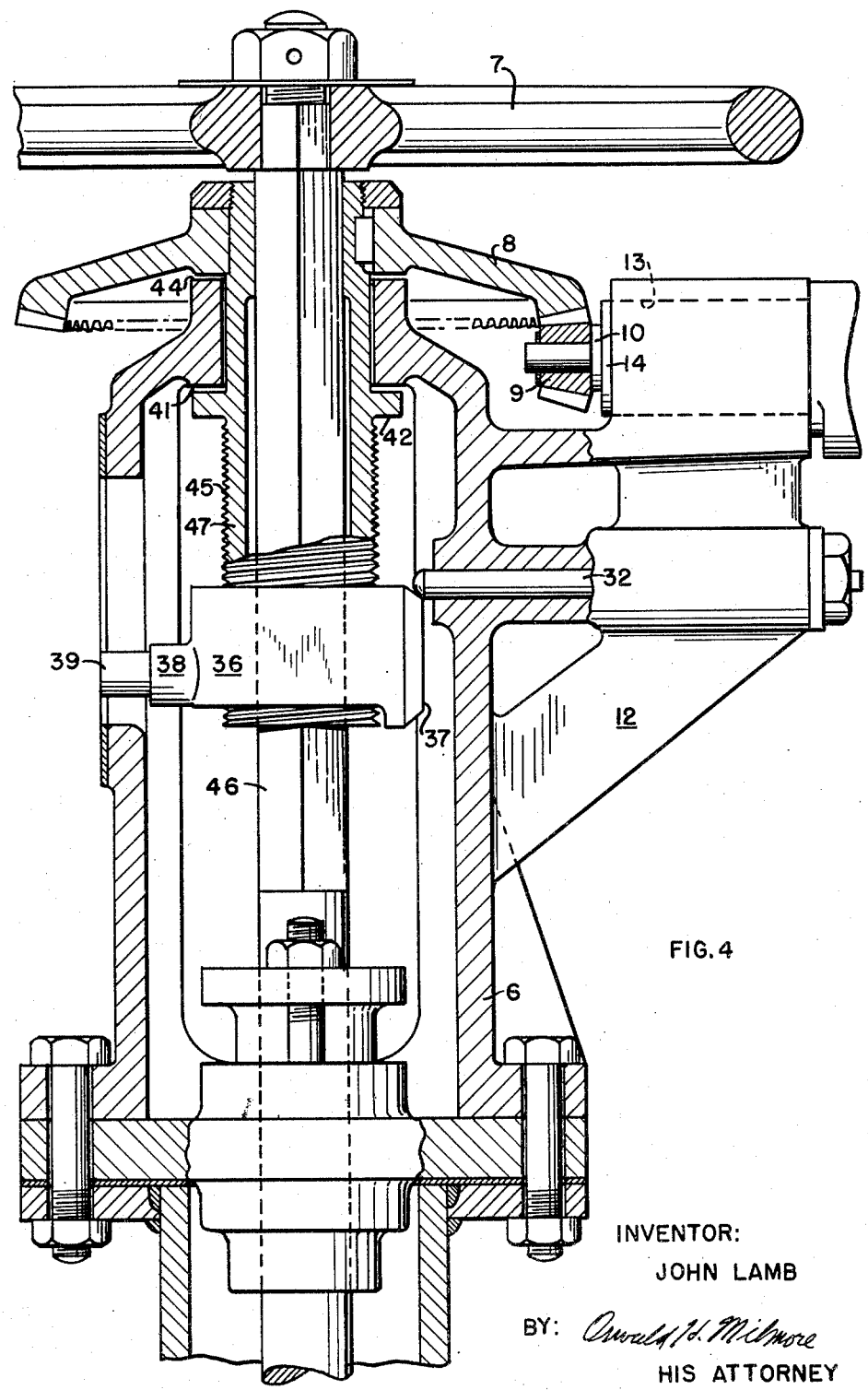

Figure 3 is a part-sectional side view of a valve of the non-rotating rising spindle, and rotating non-rising handwheel type, showing part only of the portable power unit which is in driving engagement therewith; and Figure 4 is a part-sectional side view of a valve of the rotating rising spindle and handwheel type, also showing part only of the portable power unit which is in driving engagement therewith.

In the various figures like parts bear the same reference numerals.

Figure 1:
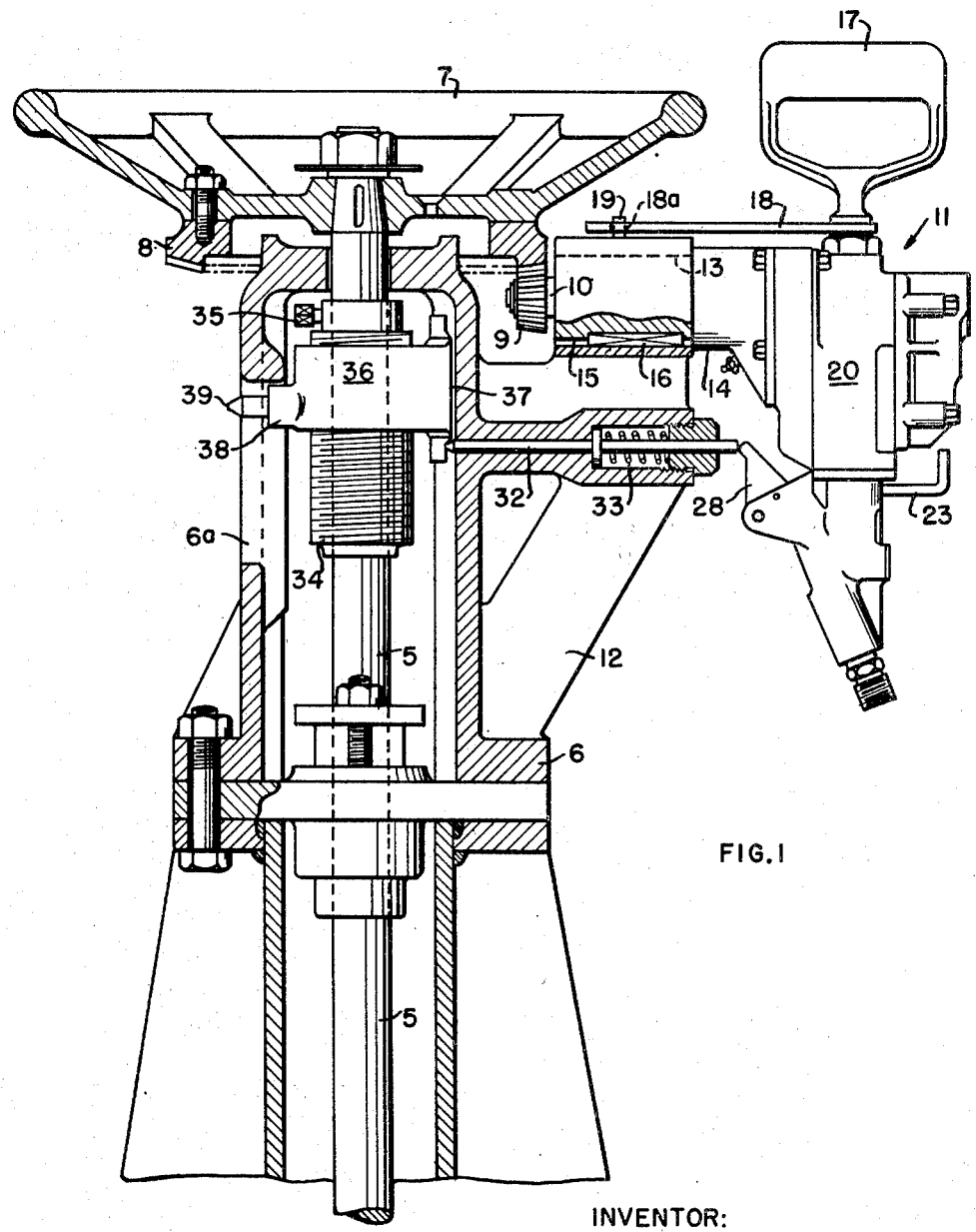
Figure 1 is a part-sectional side view showing a valve with a portable powered operator drivingly coupled thereto, the valve being of the rotating non-rising spindle, and rotating non-rising handwheel type.
Figure 2:
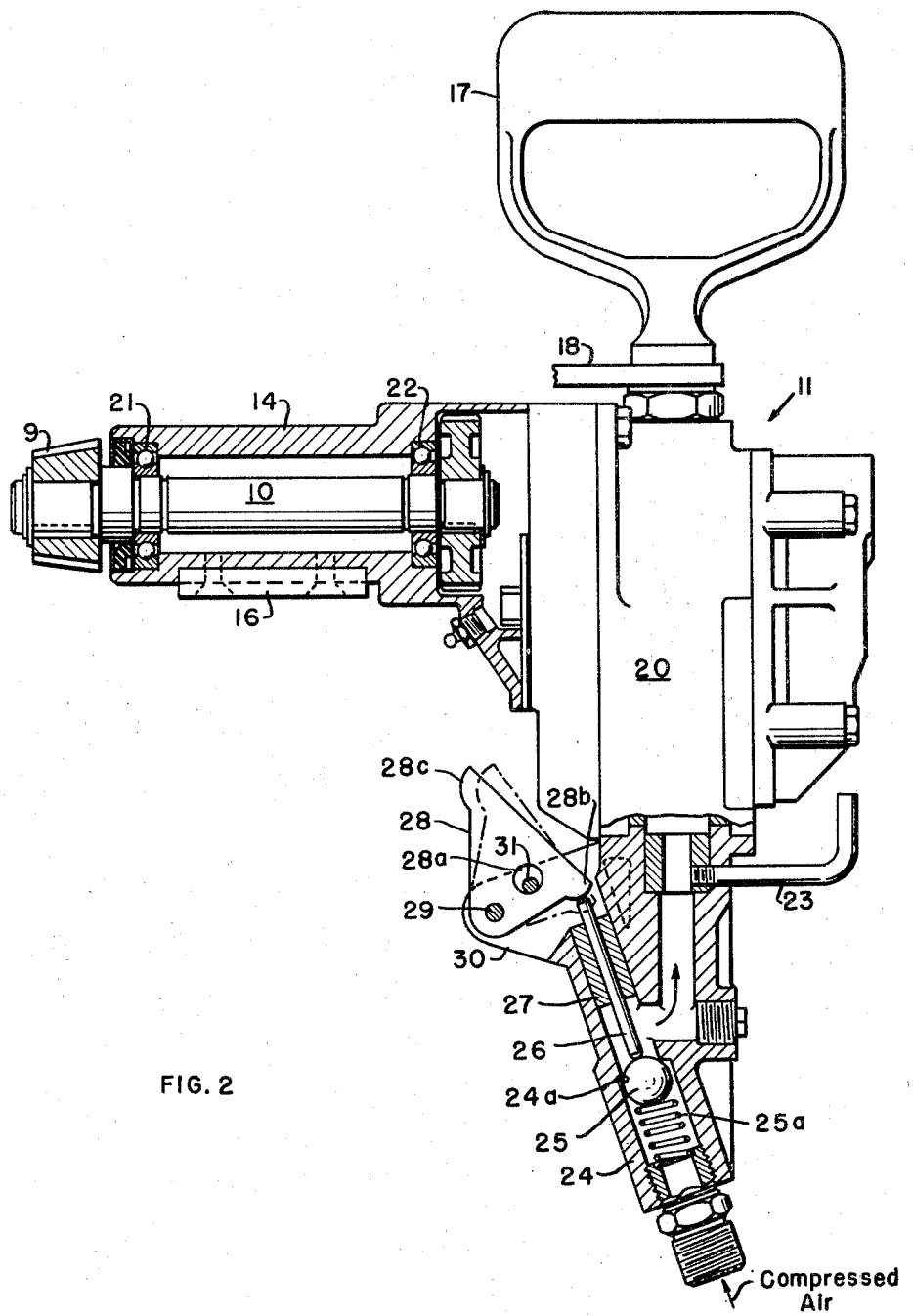
Figure 2 is a part-sectional side view on an enlarged scale of the portable power unit shown in Figure 1.

The valve shown in Figure 1 is of conventional form insofar as it has the usual valve member (not shown) movable between open and closed positions by means of a rotating non-rising spindle 5 supported by a superstructure 6 which is a part of the valve structure and disposed above the valve body (also not shown); the spindle carries a handwheel 7 at its upper end. The underside of the handwheel 7 is provided with a bevel gear wheel 8 which constitutes a rotatable drive element of the valve; it is disposed for driving engagement with a bevel pinion 9 on the output shaft 10 of a portable powered operator designated by the general reference 11 and shown in more detail in Figure 2. The valve superstructure 6 has an outwardly extending bracket 12 on which the power unit 11 is supported in the engaged position, the bracket 12 having an upper part provided with a bore 13 within which slides an outwardly extending cylindrical body portion 14 of the power unit 11, the bore 13 having a keyway 15 for the reception of a mating key 16 on the underside of the portion 14 for locating the power unit 11 correctly on the supporting bracket 12 and for transferring torque reaction to the valve superstructure 6. A carrying handle 17 pivotally mounted on the upper part of the operator 11 has attached thereto a latch in the form of a locking bar 18 having a transverse slot 18a for engagement with an upstanding pin 19 fixed in the upper part of the bracket 12 for holding the power unit firmly in position and for preventing the disengagement of the bevel gears 8, 9 by the outward thrust arising during operation.

The portable power unit 11 incorporates a motor 20 of any suitable type, e. g., similar to those used in portable drills and grinders. For example, the motor may be a multi-vane air motor of ½ H. P. at 500 or 750 R. P. M. having its output shaft 10 carried in bearings 21, 22 in the cylindrical body portion 14.

The motor has the usual manual combined reversing and stop control 23 and in addition a cut-out valve in its air supply conduit 24 which is adapted for operation by mechanism forming part of the valve, as will hereinafter be described. The cut-out valve takes the form of a ball 25 which is urged against a seating 24a by a spring 25a. The control means, whereby the ball 25 is moved away from its seating to the open position, includes a rod 26 sliding in a gland 27 in the wall of the air supply conduit 24. This rod 26 is actuated by a plate 28 which constitutes an abutment member and is mounted for limited pivotal movement on a pin 29 carried by an ear 30 upstanding from the motor body. The pivotal movement is limited by a limit pin 31 fixed to the ear 30 and extending through an opening 28a that is larger than the pin. The plate 28 has two secondary camming surfaces 28b and 28c of which the former engages the rod 26 and the latter is engaged in abutting relation by an actuating member 32 carried on the valve when the power unit 11 is drivingly coupled thereto.

The actuating member 32, which is a position-responsive element that moves in accordance with the position of the valve member on the valve spindle 5, is conveniently a rod slidably mounted in the lower part of the supporting bracket 12 with one end passing through the valve superstructure 6 and loaded by a compression spring 33 urging the rod inwardly. The valve spindle 5 has a threaded portion 34, which may be integral or formed as a separate sleeve and fixed to the shaft by a set screw 35. The threaded part carries an internally threaded collar 36 having a camming surface 37 and a projection 38. The raised, primary part of the camming surface is adapted to engage the actuating member 32 whenever the valve spindle 5 is more than say one-half turn removed from either of its extreme positions; in the extreme positions of the valve spindle 5, such as the upper position shown in Figure 1, the actuating member 32 is out of engagement with the raised, primary part of the camming surface 37 and is urged by the spring 33 against a lower part at the top or bottom thereof. The projection 38 is vertically slidable within a slot 6a formed in the superstructure 6 and retains the collar 36 against rotation. A position indicator 39, such as is customarily provided on valves of this kind, extends outwards through the slot 6a and may be combined with the collar 36.

Assuming the power unit 11 to be in a position on the supporting bracket 12, as shown, with the bevel gears 8, 9 drivingly coupled together, engagement of the actuating member 32 by the primary part of the camming surface 37 on the valve spindle 5 causes the actuating member 32 to move outwardly in the supporting bracket 12 against the spring 33, thereby moving the pivoted plate 28 in a clockwise direction to open the cut-out valve in the air supply conduit 24 of the motor. The cut-out remains in the open position during the period in which the actuating member 32 is engaged by the primary camming surface 37 on the valve spindle 5.

In operation, the manual reversing control 23, which control has a central "off" position, is set by the operator to one of the "on" positions according as to whether the valve is to be opened or shut and the power unit 11 is placed in the operating position on the supporting bracket 12 with the bevel gears 8, 9 in driving engagement. Assuming the valve to be either fully open or fully shut, the cut-out valve 25 remains closed and the motor remains inactive. The valve spindle 5 is given the necessary half-turn by manual rotation of the handwheel 7 in order to bring the primary part of the camming surface 37 into engagement with the actuating member 32, which then moves outwardly to move the spring-loaded ball 25 in the air supply conduit 24 away from its seating 24a to start the motor. If it is desired to move the valve to its other extreme position, the motor is allowed to run until it cuts out automatically on disengagement of the primary part of the camming surface 37 from the actuating member 32, which frees the latter to move inwards and permits the cut-off ball valve 25 to seat. The necessary half-turn of the valve spindle 5 to bring the valve member to its extreme position is then given by hand.

Alternately, the valve can be brought to any desired position between its extreme positions and stopped there by stopping the motor with the manual control 23. Also, as will be evident, the valve can be moved from an intermediate position to another such position or to an extreme position by suitable manipulation of the manual control 23.

The present invention is equally applicable to gate or sluice valves of types other than that just described. For example, Figure 3 shows a valve in which the valve member (not shown) is movable between open and closed positions by means of a non-rotating rising spindle 40 connected at its lower end to the valve member as is conventional practice. The spindle 40 is threaded over part of its length and restrained against rotation by convention means (not shown) which coact with the valve structure. An internally threaded bushing 41 engages the threaded part of the spindle 40 and is mounted for rotation in the valve superstructure 6. This bushing 41, which carries fixedly at its upper end the handwheel 7 and the keyed bevel gear wheel 8 for engagement with the bevel pinion 9 on the output shaft 10 of the powered operator 11, has a flange 42 that bears against a downwardly directed annular surface 43 of the superstructure 6. The hub of the gear wheel 8 bears against an upwardly directed annular surface 44. The bucking has an externally threaded portion 45 which carries the internally threaded collar 36. In operation axial thrust arising on rotation of the bushing 41 is absorbed in conventional manner by surfaces 43 and 44 of the valve superstructure 6. The spindle 40 can therefore be moved axially to open and close the valve either by manual rotation of the bushing 41 by means of the handwheel 7 or, when the spindle 40 is in a position in which it requires at least a further half-turn of the handwheel 7 to bring the valve member into one or the other of its extreme positions, by operation of the portable powered operator in the manner described with reference to Figures 1 and 2.

Figure 4 shows how the present invention is applied to a valve of the rotating rising spindle, and rotating rising handwheel type. In this construction the valve member (not shown) is movable between open and closed positions by means of a spindle 46 of square cross-section which is connected to the valve member in conventional manner through a fixed nut in the valve body (also not shown) so that rotation of the spindle 46 causes the spindle to rise or fall in the valve structure, depending on the direction of rotation, to raise or lower the valve member. Rotation of the spindle 46 is effected through a bushing 47 which is similar to the bushing 41 of Figure 3 except that it has an axial aperture of square cross section for sliding, torque-transmitting engagement with the square-section spindle 46. Alternatively, it will be appreciated that the same effect is obtained by the provision of a bushing having a splined bore cooperating with a splined spindle or by providing a keyed driving connection between the bushing 47 and the spindle 46. In the construction shown in Figure 4 the handwheel 7 is mounted on the spindle 46 for movement therewith. In other respects, however, this embodiment is similar to that of Figure 3.

It will be appreciated that the motor of the portable powered operator can, if desired, be an electric or hydraulic motor and also that it need not be a rotary motor, the cut-off element 25 being suitably replaced by an element, such as an electrical switch for controlling the application of power to the motor. Also, the rod 32 can be omitted or be a part of the portable operator, the camming surface being in that case the position-responsive element engaged by the control means of the operator.

The directional adjectives such as "vertical," as used herein, refer to the valve as shown in the drawing and do not limit the invention to valves installed in a like position.

I claim as my invention:

1. A portable powered valve operator for use on flow control valves that have a drive element for effecting movement of the valve member between open and closed positions, comprising: a rotary pneumatic motor having an output shaft; a compressed air-supply conduit connected to said motor; a cut-out valve in said supply conduit; means for disengageably coupling said output shaft to the drive element of said flow control valve including means to transmit torque between the portable operator and the structure of said flow control valve; and control means on the operator engageable and movable with a position-responsive element of said flow control valve that moves in accordance with the position of the valve member thereof for actuating said cut-out valve to start and stop said motor at predetermined positions of said valve member.

2. A portable valve operator according to claim 1 wherein said cut-out valve is a spring-loaded valve and said control means includes an abutment member adapted for abutting engagement with said position-responsive element of the flow control valve and connected to open and close said spring-loaded valve in accordance with the position of the abutment member.

3. A portable valve operator according to claim 1 wherein said pneumatic motor is reversible and is provided with a reversing and stop control device independent of said cut-out valve, whereby said motor can be stopped independently of the position of said control means.

4. A portable powered valve operator for use on valves that have a drive element for effecting movement of the valve member between open and closed positions comprising: a motor having an output shaft, a bevel pinion gear thereon for engagement with a mating gear wheel on the drive element of the valve, means for supplying power to said motor, a cut-out device on the operator for controlling the supply of power to the motor, a body engageable with a positioning guide on the valve structure to locate said pinion gear correctly for engagement with said mating gear wheel, a latch on said body engageable with the valve structure for retaining the portable operator in operative position on said guide and control means on the operator engageable and movable with a position responsive element of the valve that moves in accordance with the position of the valve member thereof for actuating said cut-out device to start and stop said motor at predetermined positions of said valve member.

5. Apparatus for the power operation of valves of the kind in which rotation of a handwheel causes movement of the valve member thereof between open and closed positions comprising in combination: a valve structure having a valve spindle mounted for rotation and secured against rising in said structure for moving said valve member, a bevel gear wheel in driving connection with said valve spindle, a cam movable with respect to said structure in accordance with the position of said valve member and detachably engaged to said structure, a portable powered valve operator having a motor with an output shaft, a bevel pinion gear on the output shaft meshing with said bevel gear wheel, means for supplying power to the motor, a cut-out device having control means movable by said cam to start and stop said motor at predetermined positions of said valve member.

6. Apparatus according to claim 5 wherein said cam is an internally threaded collar vertically and non-rotatably mounted in said valve structure and having internal threaded engagement with a threaded portion of said valve spindle.

7. Apparatus according to claim 5 wherein said valve spindle is mounted against rotation and for rising movement in relation to said valve structure.

8. Apparatus according to claim 5 wherein said valve spindle is mounted for rotation and rising movement in relation to said valve structure.

9. Apparatus according to claim 5 wherein said valve structure includes a positioning guide mating with a portion of the portable powered valve operator to position said operator correctly in relation to the valve structure, said valve structure and said operator having mutually engaging surfaces disposed to transmit torque about the axis of said output shaft and said apparatus including releasable retaining means for positively holding said output shaft and said pinion gear in driving relationship with said bevel gear wheel.

10. Apparatus for the power operation of valves in which rotation of a handwheel causes movement of the valve member between open and closed positions comprising in combination: a valve structure having a valve spindle movably supported thereby for moving said valve member, a rotatable drive element having driving connection with said spindle, a position responsive element movable with respect to said structure in accordance with the position of said valve member, a positioning guide on said valve structure, a portable powered operator mounted on said positioning guide in disengageable driving relation to said drive element, said portable operator comprising a reversible rotary pneumatic motor having an output shaft, a compressed air supply conduit connected to said motor and a spring loaded cut-out valve in said supply conduit having control means adapted for engagement with and for actuation by said position responsive element to control the operation of the motor in accordance with the position of said valve member.

References Cited in the file of this patent

UNITED STATES PATENTS

| | | |
|---|---|---|
| 2,028,696 | Beckwith | Jan. 21, 1936 |
| 2,414,032 | Fawkes | Jan. 7, 1947 |

FOREIGN PATENTS

| | | |
|---|---|---|
| 725,879 | France | 1932 |